US006111250A

United States Patent [19]
Thomson et al.

[11] Patent Number: 6,111,250

[45] Date of Patent: *Aug. 29, 2000

[54] QUADRUPOLE WITH AXIAL DC FIELD

[75] Inventors: Bruce A. Thomson, Etobicoke; Charles L. Jolliffe, Schomberg, both of Canada

[73] Assignee: MDS Health Group Limited, Toronto, Canada

[ * ] Notice: This patent is subject to a terminal disclaimer.

[21] Appl. No.: 09/176,094

[22] Filed: Oct. 21, 1998

Related U.S. Application Data

[63] Continuation of application No. 08/796,582, Feb. 6, 1997, Pat. No. 5,847,386, which is a continuation-in-part of application No. 08/514,372, Aug. 11, 1995, abandoned.

[51] Int. Cl.[7] ............................ B01D 59/44; H01J 49/00

[52] U.S. Cl. .......................... 250/282; 250/292; 250/280

[58] Field of Search .................................... 250/288, 292, 250/282

[56] References Cited

U.S. PATENT DOCUMENTS

| | | | |
|---|---|---|---|
| 3,699,330 | 10/1972 | McGinnis | 250/41.9 |
| 3,935,452 | 1/1976 | Prince | 250/283 |
| 4,963,736 | 10/1990 | Douglas et al. | 250/292 |
| 5,179,278 | 1/1993 | Douglas | 250/290 |
| 5,420,425 | 5/1995 | Bier et al. | 250/292 |
| 5,572,035 | 11/1996 | Franzen | 250/292 |
| 5,576,540 | 11/1996 | Jolliffe | 250/292 |
| 5,640,011 | 6/1997 | Wells | 250/282 |

FOREIGN PATENT DOCUMENTS 0 290 712 11/1988 European Pat. Off. .

OTHER PUBLICATIONS

C. Beaugrand, "A Double Collision Cell for Quadrupole MS/MS Instruments", Abstracts of the 33rd ASMS Conference on Mass Spectrometry and Allied Topics, 1985 pp. 833,834.

R.H. Stokes et al, "RF Quadrupole Beam Dynamics", IEEE Transactions on Nuclear Science, vol. NS–26, No. 3, Jun. 1979, pp. 3469–3471.

I.M. Kapchineskij and N.V. Lazarev, "The Linear Accelerator Structures with Space–Uniform Quadrupole Focusing", IEEE Transactions on Nuclear Science, vol. NS–26, No. 3, Jun. 1979, pp. 3462–3468.

Beaugrand et al, "Kinetic Energy Measurement in a Tandem Quadrupole Mass Spectrometer", Abstracts of the 34th ASMS Conference on Mass Spectrometry, 1987, p. 209.

Dieter Gerlich, "Inhomogeneous RF Fields: A Versatile Tool for the Study of Processes with Slow Ions", State–Selected and State–to–State Ion–Molecule Reaction Dynamics, Part 1: Experimental, 1992, p. 70.

*Primary Examiner*—Bruce C. Anderson
*Attorney, Agent, or Firm*—Bereskin & Parr

[57] ABSTRACT

In a mass spectrometer, typically a quadrupole, one of the rod sets is constructed to create an axial field, e.g. a DC axial field, thereon. The axial field can be created by tapering the rods, or arranging the rods at angles with respect to each other, or segmenting the rods, or by providing a segmented case around the rods, or by providing resistively coated or segmented auxiliary rods, or by providing a set of conductive metal bands spaced along each rod with a resistive coating between the bands, or by forming each rod as a tube with a resistive exterior coating and a conductive inner coating, or by other appropriate methods. When the axial field is applied to Q0 in a tandem quadrupole set, it speeds passages of ions through Q0 and reduces delay caused by the need to refill Q0 with ions when jumping from low to high mass in Q1. When used as collision cell Q2, the axial field reduces the delay needed for daughter ions to drain out of Q2. The axial field can also be used to help dissociate ions in Q2, either by driving the ions forwardly against the collision gas, or by oscillating the ions axially within the collision cell.

7 Claims, 9 Drawing Sheets

QUADRUPOLE WITH AXIAL DC FIELD

CONTINUING APPLICATION DATA

This application is a continuation of our application Ser. No. 08/796,582 filed Feb. 6, 1997, now U.S. Pat. No. 5,847,386, which is a continuation-in-part of our application Ser. No. 08/514,372 filed Aug. 11, 1995 now abandoned.

FIELD OF THE INVENTION

This invention relates to spectrometers of the kind having an elongated conductor set. More particularly, it relates to spectrometers having an axial electric field extending along the conductor set.

BACKGROUND OF THE INVENTION

Mass spectrometers having an elongated conductor set, typically quadrupole mass spectrometers (which have four rods) have been in common use for many years. It has become common to use such rod sets in tandem in a vacuum chamber. In many such instruments there are four rod sets, referred to as Q0, Q1, Q2 and Q3. Rod set Q0 receives ions and gas from an ion source and has a radio frequency voltage (RF) only applied to it, to act as an ion transmission device while permitting gas therein to be pumped away. Rod set Q1 has RF and DC applied thereto, to act as a mass filter, e.g. to transmit a desired parent ion. Rod set Q2 has collision gas supplied thereto, to act as a collision cell for fragmentation of the parent ions, and typically has only RF applied thereto. Rod set Q3 has RF and DC applied thereto to act as a scannable mass filter for the daughter ions produced in collision cell Q2.

In tandem mass spectrometers of the kind referred to above, and also in other mass spectrometers, gas within the volumes defined by the RF rod sets Q0 and Q2 improves the sensitivity and mass resolution by a process known as collisional focusing, described e.g in U.S. Pat. No. 4,963,736. In that process, collisions between the gas and the ions cause the velocities of the ions to be reduced, causing the ions to become focused near the axis. However the slowing of the ions also creates delays in ion transmission through the rod sets, and from one rod set to another, causing difficulties.

For example, when rod set Q0 transmits ions from an atmospheric pressure ion source into rod set Q1, the gas pressure in Q0 can be relatively high (e.g. above 5 millitorr for collisional focusing), and collisions with the gas can slow the ions virtually to a stop. Therefore there is a delay between ions entering Q0 and the ions reaching Q1. This delay can cause problems in multiple ion monitoring, where several ion intensities are monitored in sequence, at a frequency which is faster than the ion transit time through Q0. In that case the signal from ions entering Q1 may never reach a steady state, so the measured ion intensity may be too low and may be a function of the measurement time.

Similarly, after daughter ions have been formed in collision cell Q2, the ions drain slowly out of Q2 because of their very low velocity after many collisions in Q2. The ion clear out time (typically several tens of milliseconds) can cause spurious readings (e.g. interference between adjacent channels when monitoring several ion pairs, i.e. parent/fragments, in rapid succession). To avoid this, a fairly substantial pause time is needed between measurements, reducing the productivity of the instrument. The extended ion clear out time can also cause spurious peak broadening.

BRIEF SUMMARY OF THE INVENTION

Accordingly, it is an object of the present invention in one of its aspects to provide a method of mass analyzing a sample comprising:

(a) defining a volume between a set of elongated multipole rods, said volume having an elongated axial dimension and F radial dimension, and further including an entrance and an exit located on the axis, (b) providing a collision gas in said volume, (c) introducing ions at the entrance to the volume, (d) applying an AC potential at least to said rods to confine ions in said volume for passage through the volume from the entrance to the exit, (e) causing ions in said volume to fragment, (f) rapidly varying said ions introduced at the entrance from first ions of a first mass to charge ratio to second ions of a second and different mass to charge ratio, and repeating such rapid variation, (g) detecting ions leaving the exit of the volume, and providing a pause time of selected duration between detection of ions during supply of said first ions and detection of ions during supply of said second ions, (h) and establishing an axial DC electric field in said volume to cause substantially all of said first ions in said volume during said pause time to exit said volume within said pause time.

The invention in another aspect provides a method of analyzing a sample comprising:

(a) isolating parent ions, (b) fragmenting said parent ions in a volume defined by an elongated multipole rod set, to produce a set of fragment ions in said volume, said volume containing a collision gas to promote the formation of said fragments, (c) injecting said fragment ions into a mass spectrometer following said multipole rod set, for analysis of said fragments, (d) scanning said parent ions over a mass range, thereby producing a parent ion scan, (e) and establishing an axial field in said rod set to speed transmission of fragment ions therefrom into said following whereby when the step of scanning the parent ions has moved from a previous parent ion to a subsequent parent ion, the time required for fragment ions from the previous parent ion to clear the volume and enter the following mass spectrometer will be reduced, thereby enabling faster scanning of a desired parent ion range.

In still another aspect the invention provides a method of analyzing a sample comprising:

(a) injecting ions from an ion source into a first multipole elongated rod set defining a volume having a longitudinal axis, for isolating ions of interest in said volume, (b) transmitting ions of interest or ions derived therefrom, from said first rod set into a following multipole rod set for further processing, to produce a first output ion measurement, (c) rapidly changing a first resolving voltage applied to said first multipole rod set and thereby emptying said first multipole rod set of said ions of interest, to obtain a second output ion measurement, (d) applying an axial DC electric field along at least a portion of said axis to cause ions from said source to rapidly refill said volume, to decrease the time required for ions in said volume to reach a steady state for said second output ion measurement.

In yet another aspect the invention provides a method of improving the fragmentation efficiency of an RF multipole rod set, said rod set defining an elongated volume having a longitudinal axis and an exit, and a collision gas in said volume, said method comprising injecting ions into said volume with an axial electric velocity, and applying an axial field along said axis to increase the collision energy of said ions.

DETAILED DESCRIPTION OF PREFERRED EMBODIMENTS

Figure 1:
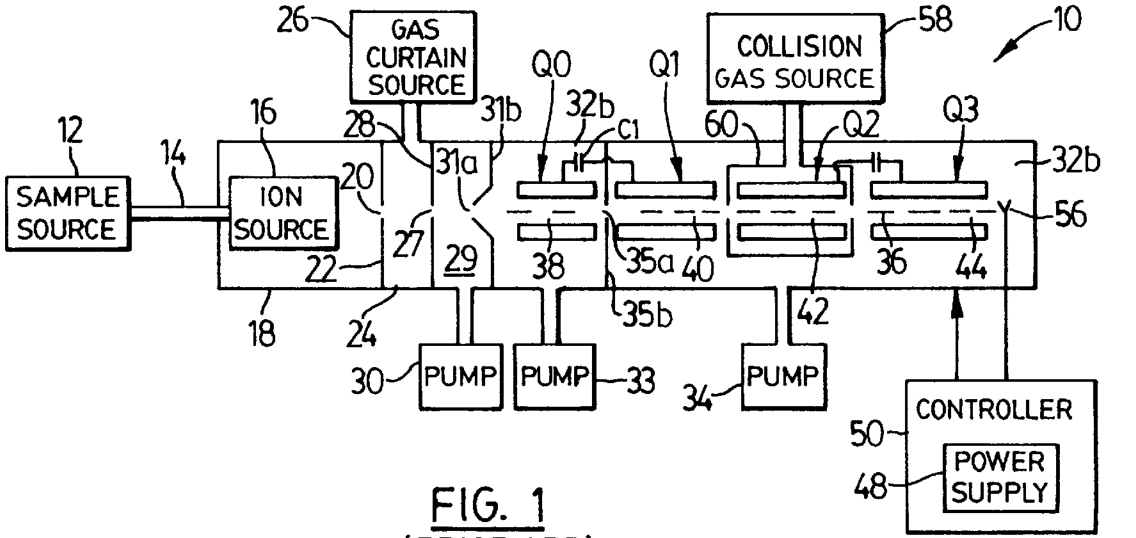
FIG. 1 (PRIOR ART)
FIG. 1 is a diagrammatic view of a prior art tandem mass spectrometer of the kind with which the invention may be used.
Figure 2:
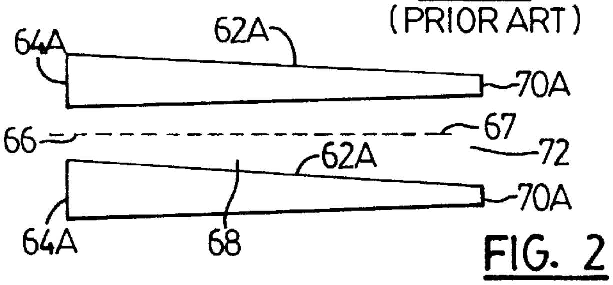
FIG. 2 is a side view of two rods of a tapered rod set for use in place of one of the rod sets of the FIG. 1 mass spectrometer.
Figure 3:
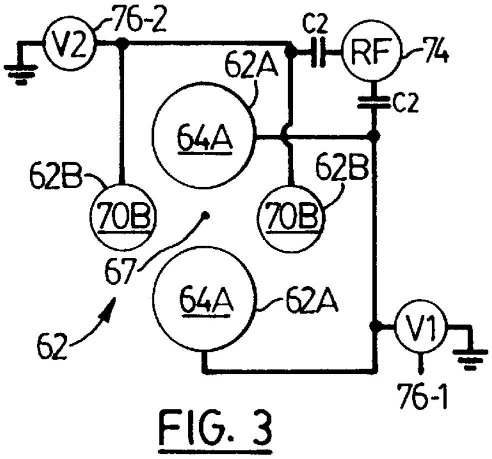
FIG. 3 is an end view of the entrance end of the FIG. 2 rod set.
Figure 4:
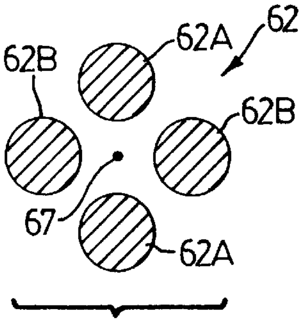
FIG. 4 is a cross-sectional view at the center of the rod set of FIG. 2.
Figure 5:
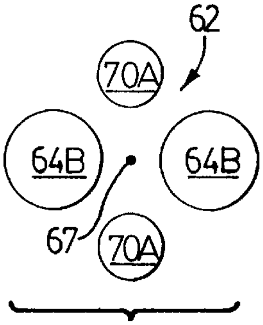
FIG. 5 is an end view of the exit end of the FIG. 2 rod set.
Figure 6:
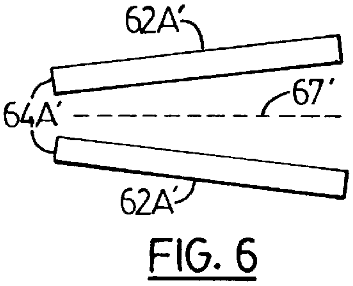
FIG. 6 is a side view of two rods of a modified rod set according to the invention.
Figure 7:
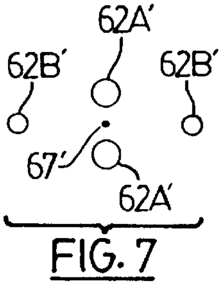
FIG. 7 is an end view of the entrance end of the FIG. 6 rod set.
Figure 8:
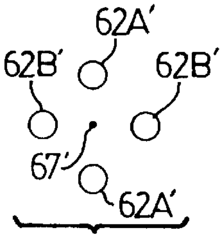
FIG. 8 is a cross-sectional view at the center of the FIG. 6 rod set.
Figure 9:
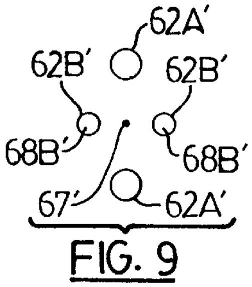
FIG. 9 is an end view of the exit end of the FIG. 6 rod set.

Reference is first made to FIG. 1, which shows a conventional prior art mass spectrometer 10 of the kind with which the present invention can be used. Mass spectrometer 10 includes a conventional sample source 12, which can be a liquid chromatograph, a gas chromatograph, or any other desired source of sample. From source 12, a sample is conducted via tube 14 to an ion source 16 which ionizes the sample. Ion source 16 can be (depending on the type of sample) an electrospray or ion spray device, as shown in U.S. Pat. Nos. 4,935,624 and 4,861,988 respectively, or it can be a corona discharge needle (if the sample source is a gas chromatograph) or it can be a plasma, as shown in U.S. Pat. No. 4,501,965. Ion source 16 is located in chamber 18.

From ion source 16, ions are directed through an aperture 20 in a plate 22, through a gas curtain chamber 24 supplied with curtain gas (e.g. $N_2$) by a gas curtain source 26 (as shown in U.S. Pat. No. 4,137,750). The ions then travel through an orifice 27 in orifice plate 28 and into a first stage vacuum chamber 29 pumped e.g. to 1 torr by a vacuum pump 30. The ions then travel through a skimmer opening 31_a_ in a skimmer 31_b_ and into a vacuum chamber 32. Vacuum chamber 32 is divided into a stage 32_a_, pumped e.g. to 8 millitorr by pump 33, and a stage 32_b_ pumped e.g. to $3\times10^{-5}$ millitorr by pump 34. An orifice 35_a_ in plate 35_b_ connects stages 32_a_, 32_b_.

Vacuum chamber 32 contains four sets of quadrupole rods, indicated as Q0, Q1, Q2 and Q3. The four sets of rods extend parallel to each other along a common central axis 36 and are spaced slightly apart end to end so that each defines an elongated interior volume 38, 40, 42, 44.

Appropriate RF and DC potentials are applied to opposed pairs of rods of the rod sets Q0 to Q3, and to the various ion optical elements 22, 28, 31*b* and 35*b* by a power supply 48 which is part of a controller diagrammatically indicated at 50. Appropriate DC offset voltages are also applied to the various rod sets by power supply 48. A detector 56 detects ions transmitted through the last set of rods Q3.

In use, normally only RF is applied to rod set Q0 (via capacitors C1 from rod set Q1 to avoid the need for a separate power supply), plus a DC rod offset voltage which is applied uniformly to all the rods. This rod offset voltage delivers the electric potential inside the rod set (the axial potential). Because the rods have conductive surfaces, and the rod offset potential is applied uniformly to all four rods, the potential is constant throughout the length of the rod set, so that the electric field in an axial direction is zero (i.e. the axial field is zero). Rod set Q0 acts as an ion transmission device, transmitting ions axially therethrough while permitting gas entering rod set Q0 from orifice 31*a* to be pumped away. Therefore the gas pressure in rod set Q0 can be relatively high, particularly when chamber 18 is at atmospheric pressure and the pressure in gas curtain chamber 24 is slightly above atmospheric. The gas pressure in rod set Q0 is in any event kept fairly high to obtain collisional focusing of the ions, e.g. it can be about 8 millitorr. By way of typical example, the offsets applied may be 1,000 volts DC on plate 22, 100 volts DC on plate 28, 0 volts on the skimmer 31*b*, and −20 to −30 volts DC offset on Q0 (this may vary depending on the ion being looked at). The rod offsets for Q1, Q2 and Q3 depend on the mode of operation, as is well known.

Rod set Q1 normally has both RF and DC applied to it, so that it acts as an ion filter, transmitting ions of desired mass (or in a desired mass range), as is conventional.

Rod set Q2 has collision gas from a collision gas source 58 injected into its interior volume 42 and is largely enclosed in a grounded metal case 60, to maintain adequate gas pressure (e.g. 8 millitorr) therein. Rod set Q2 has RF only applied to it, plus (as mentioned) a rod offset voltage which defines the electric potential in the volume of the rod set. The rod offset voltage is used to control the collision energy in an MS/MS mode, where Q2 acts as a collision cell, fragmenting the parent ions transmitted into it through rod sets Q0 and Q1.

The daughter ions formed in the collision cell constituted by rod set Q2 are scanned sequentially through rod set Q3, to which both RF and DC are applied. Ions transmitted through rod set Q3 are detected by detector 56. The detected signal is processed and stored in memory and/or is displayed on a screen and printed out.

Reference is next made to FIGS. 2 to 5, which show a modified quadrupole rod set 62 according to the invention. The rod set 62 comprises two pairs of rods 62A, 62B, both equally tapered. One pair 62A is oriented so that the wide ends 64A of the rods are at the entrance 66 to the interior volume 68 of the rod set, and the narrow ends 70A are at the exit end 72 of the rod set. The other pair 62B is oriented so that its wide ends 64B are at the exit end 72 of the interior volume 68 and so that its narrow ends 70B are at the entrance 66. The rods define a central longitudinal axis 67.

Each pair of rods 62A, 62B is electrically connected together, with an RF potential applied to each pair (through isolation capacitors C2) by an RF generator 74 which forms part of power supply 48. A separate DC voltage is applied to each pair, e.g. voltage V1 to one pair 62A and voltage V2 to the other pair 62B, by DC sources 76-1 and 76-2 (also forming part of power supply 48).

The tapered rods 62A, 62B are located in an insulated holder or support (not shown) so that the centers of the rods are on the four corners of a square. Other spacings may also be used to provide the desired fields. For example the centers of the wide ends of the rods may be located closer to the central axis 67 than the centers of the narrow ends.

Alternatively the rods may all be of the same diameter, as shown in FIGS. 6 to 9 in which primed reference numerals indicate parts corresponding to those of FIGS. 2 to 5. In FIGS. 6 to 9 the rods are of the same diameter but with the ends 64A' of one pair 62A' being located closer to the axis 67' of the quadrupole at one end and the ends 68B' of the other pair 62B' being located closer to the central axis 67' at the other end. In both cases described, the DC voltages provide an axial potential (i.e. a potential on the axis 67) which is different at one end from that at the other end. Preferably the difference is smooth, but as will be described it can also be a step-wise difference. In either case an axial field is created along the axis 67.

In the version shown in FIGS. 2 to 5, the DC potential on the center axis 67 at the entrance end 66 is closer to the potential on the large diameter rod ends 64A (V1) because of their proximity. At the exit end 72 the potential is also closer to the potential on the large diameter rod ends 64B, so the potential is closer to V2. In one example, the rod diameters differed from each other by forty percent (at the large end the diameter of each rod was 12.5 mm and at the small end the diameter was 7.5 mm), and potentials V1 and V2 were 3 volts and 2 volts respectively.

Figure 10:
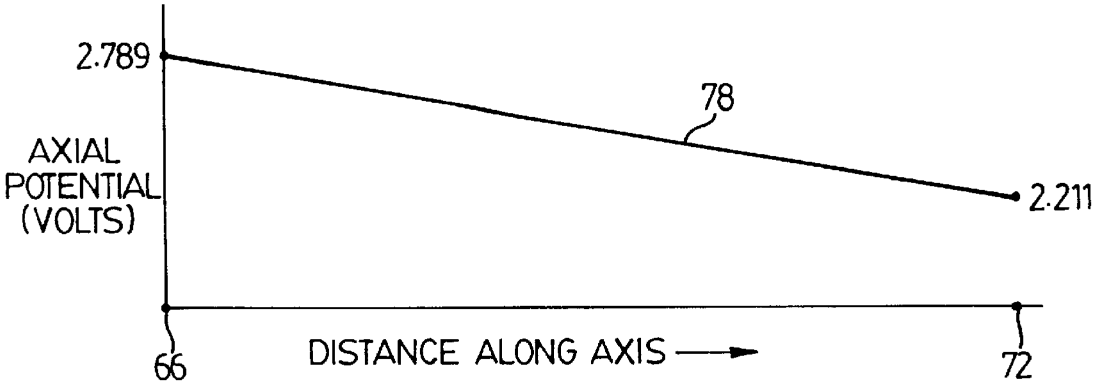
FIG. 10 is a plot showing a typical DC voltage gradient along the center axis of the rod set of FIGS. 2 to 5.

In that case the potential along the center axis 67, calculated by a modelling program, varied from 2.789 volts at the entrance end 66 to 2.211 volts at the exit end 72. The axial potential 78 is shown in FIG. 10, where the potential along axis 67 is plotted on the vertical axis and the distance from the entrance 66 to the exit 72 is plotted on the horizontal axis.

Figure 11:
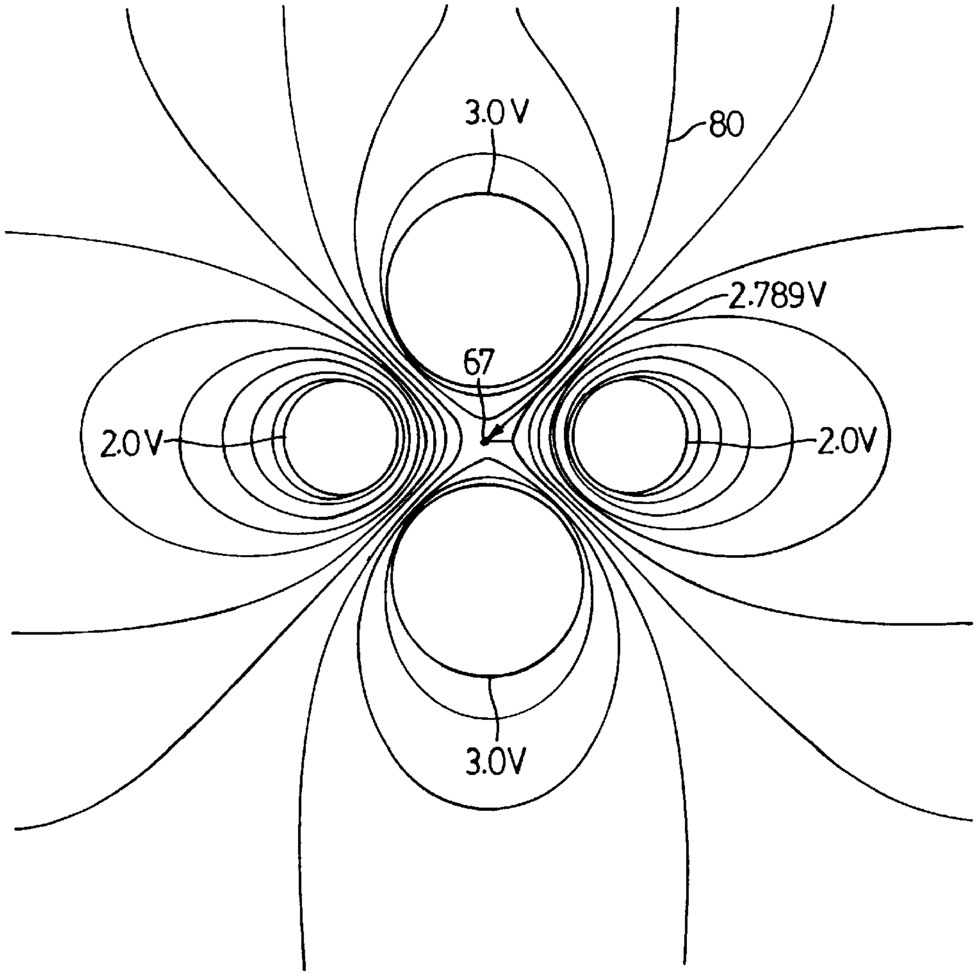
FIG. 11 is a sectional view showing the electric field pattern around the rod set of FIGS. 2 to 5.

FIG. 11 shows the equipotential lines 80 at one end of the rod set 62 in a plane perpendicular to the quadrupole axis 67, and from which the center axis potential is derived.

The effectiveness of the geometry described was demonstrated by constructing an RF quadrupole with the geometry shown in FIGS. 2 to 5 and operating it as the collision cell (Q2) in a triple quadrupole mass spectrometer system of the kind shown in FIG. 1. As described, in this configuration the quadrupole consisting of the four tapered rods 62A, 62B was enclosed in the grounded metal case 60, with insulated entrance and exit apertures, with V1=3 volts and V2=2 volts. The pressure in collision cell Q2 was set at approximately 8.0 millitorr, and the ion signal from the m/z 195 fragment ion of the m/z 609 parent ion of reserpine was monitored (designated 609/195). Thus, Q1 was tuned to pass mass m/z 609 and Q3 was tuned to pass m/z 195.

The data system in controller 50 was set to transmit the 609/195 ion for approximately 10 milliseconds (ms), and then Q1 was automatically set to mass m/z 600, at which mass there is no parent ion to give a m/z 195 fragment. After setting Q1 to m/z 600 (still with Q3 at m/z 195), there was a pause time during which the ion signal was not measured. The pause time could be varied between 0 and 500 milliseconds. After the pause time, the ion signal at m/z 600/195 was measured for 10 milliseconds, and then the cycle was repeated.

Figure 12:
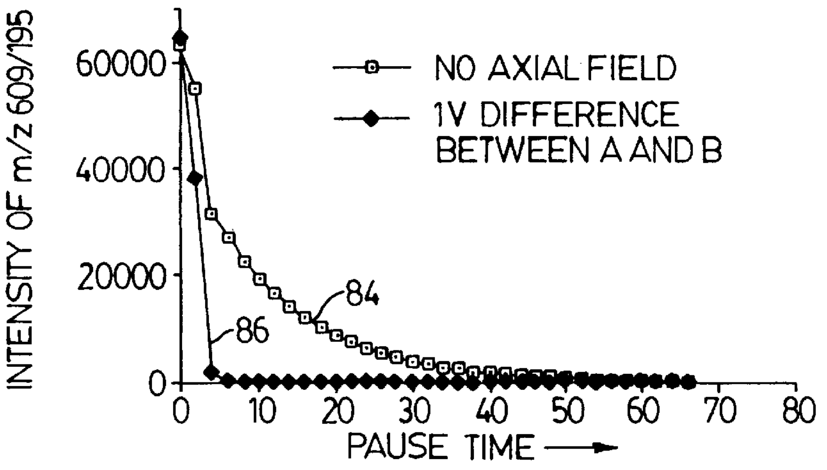
FIG. 12 is a plot showing ion signal intensity versus time when the rod set of FIGS. 2 to 5 is used in place of rod set Q2 of the FIG. 1 apparatus.

FIG. 12 plots the intensity of the m/z 600/195 signal on the vertical axis, versus pause time in milliseconds on the horizontal axis. The plot for a standard quadrupole without an axial field is shown at 84, and the plot for a quadrupole having tapered rods as shown in FIGS. 2 to 5 is shown at 86.

It will be seen from plot 84 that with a standard quadrupole without an axial field, the signal from ions of mass 609/195 persists for more than 30 milliseconds after moving Q1 to m/z 600 because ions of the daughter mass 195, formed from the m/z 609 parent, are still leaking out of Q2 and are thus recorded in the 600/195 channel. In other words, ions drain slowly out of rod set Q2 because of their very low velocity after many collisions in Q2. (Q2 is in effect acting as a gaseous ion source for Q3.)

When an axial field is created by applying a 1 volt difference between rods 62A and rods 62B, this difference creates an axial field as described above, calculated to be 0.578/15=0.038 volts per centimeter (for 15 centimeter long rods). As shown by plot 86 in FIG. 12, this axial field is sufficient to remove most of the ions from rod set Q2 in a time period less than 10 ms.

A higher DC potential results in a somewhat faster clear-out time, e.g. a voltage difference of 3.0 volts results in a clear-out time of less than 2.0 ms. However a voltage difference which is too large (greater than about 3.0 volts in this case) results in a decrease in ion signal because of the radial field component induced by the voltage difference between adjacent rods.

A major advantage of rapidly emptying rod set Q2 is that there is no interference between adjacent channels when monitoring several ion pairs (parent/fragment) in rapid succession. Without the axial field, interference is observed when monitoring ion pairs with the same parent mass in rapid succession. As shown, at a pressure of 8 millitorr an axial field of as little as 0.038 volts per centimeter is sufficient to eliminate the interference when a pause time of 10 milliseconds or greater is used between measurements. At higher pressures a greater field will be needed to produce the same effect.

In addition, interference in the parent scan and neutral loss scan mode, caused by the same problem of ion delay in rod set Q2, is eliminated when a sufficient axial field is used. In a parent scan mode for example, rod set Q3 m/z is fixed and rod set Q1 is scanned over a mass range. Parent ions which give rise to the specific fragment mass transmitted through rod set Q3 produce a mass spectrum. If the scan rate is high, and the pressure in rod set Q2 is such as to produce a delay of many milliseconds in clearing the collision cell, then the trailing ion signal gives rise to spuriously wide peaks, since even though Q1 has passed the window for transmission of the parent ion, the fragments formed in Q2 (from the parent ion which is no longer being transmitted into Q2) are still leaking into Q3.

Figure 13A:
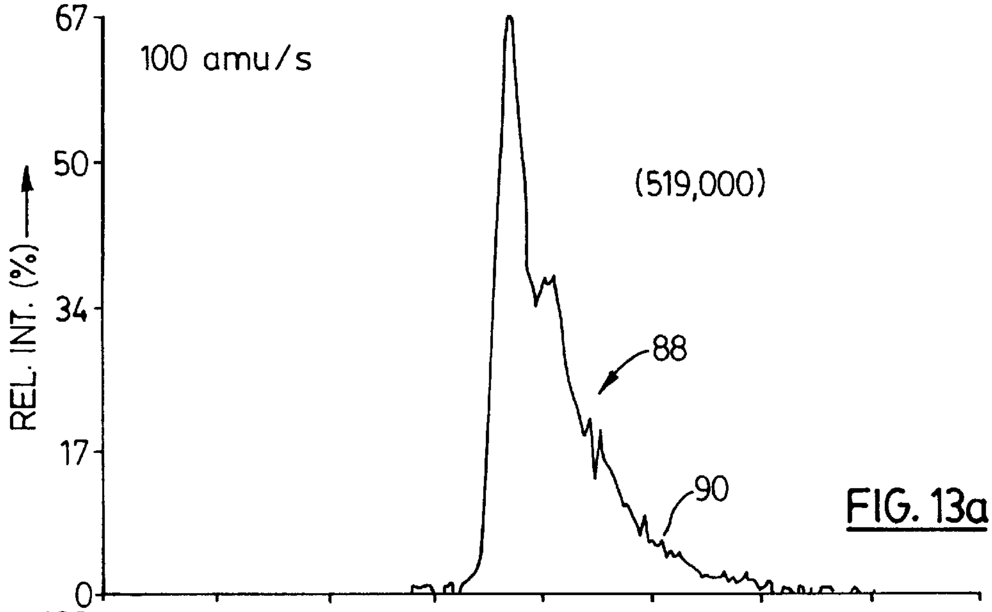
FIG. 13A is a mass spectrum made using a conventional mass spectrometer and showing a spuriously wide peak.

This delay in clearing out Q2 gives rise to the peak shape shown at 88 in FIG. 13A, which plots relative signal intensity on the vertical axis and m/z on the horizontal axis. Plot 88 has a spurious broadened tail 90.

Figure 13B:
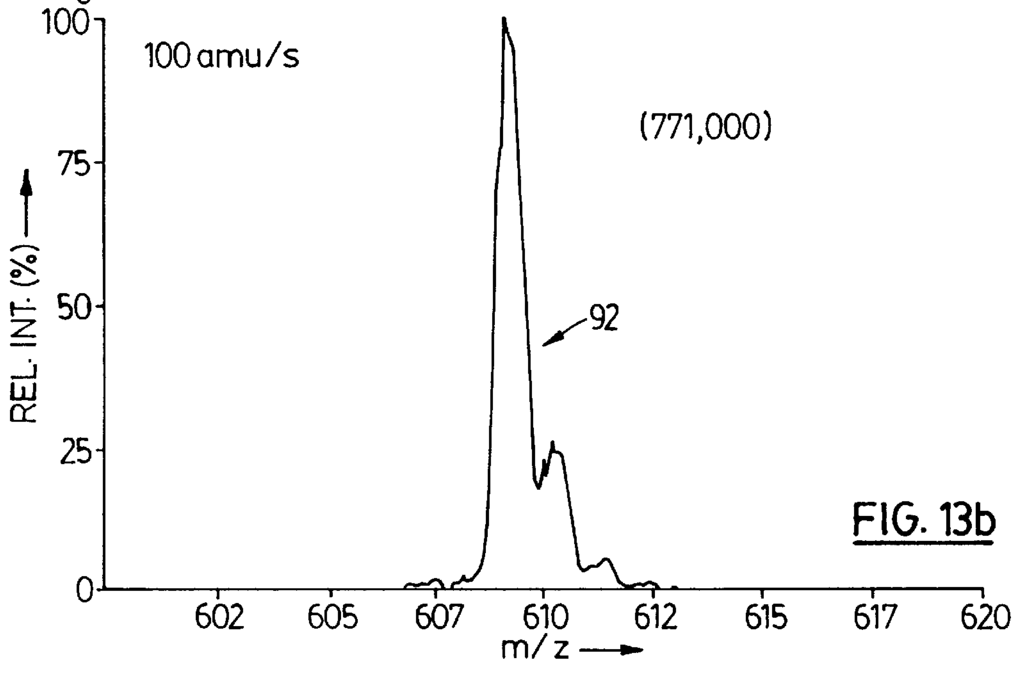
FIG. 13B shows a mass spectrum similar to that of FIG. 13A but made using the rod set of FIGS. 2 to 5 as rod set Q2 of FIG. 1.

FIG. 13B shows the peak shape 92 achieved when the axial field (1.0 volts difference between the ends) is applied to keep the ions moving at a higher velocity through rod set Q2. As shown in FIG. 13B, there is better definition between the peaks and there is no high mass "tail" of the kind shown at 90 in FIG. 13A.

Figure 14:
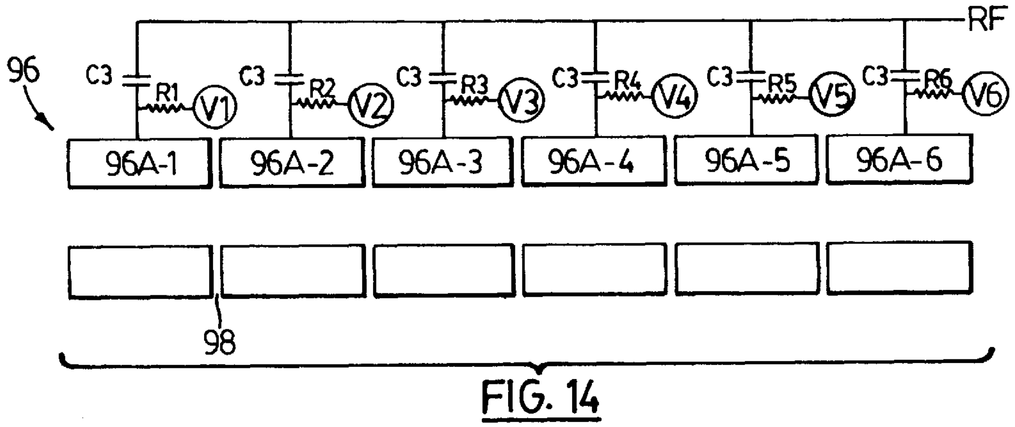
FIG. 14 is a side view of two rods of another modified rod set according to the invention.
Figure 15:
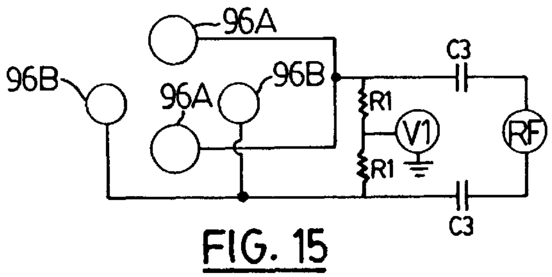
FIG. 15 is an end view of the rod set of FIG. 14 and showing electrical connections thereto.

Reference is next made to FIGS. 14 and 15, which show another variation of the invention. FIGS. 14 and 15 show a quadrupole rod set 96 consisting of two pairs of parallel cylindrical rods 96A, 96B arranged in the usual fashion but divided longitudinally into six segments 96A-1 to 96A-6 and 96B-1 to 96B-6 (sections 96B-1 to 6 are not separately shown). The gap 98 between adjacent segments or sections is very small, e.g. about 0.5 mm. Each A section and each B section is supplied with the same RF voltage from RF generator 74, via isolating capacitors C3, but each is supplied with a different DC voltage V1 to V6 via resistors R1 to R6. Thus, sections 96A-1,96B-1 receive voltage V1, sections 96A-2, 96B-2 receive voltage V2, etc. This produces a stepped voltage along the central longitudinal axis 100 of the rod set 96, as shown at 102 in FIG. 16 which plots axial voltage on the vertical axis and distance along the rod set on the horizontal axis. The separate potentials can be generated by separate DC power supplies for each section or by one power supply with a resistive divider network to supply each section.

Figure 16:
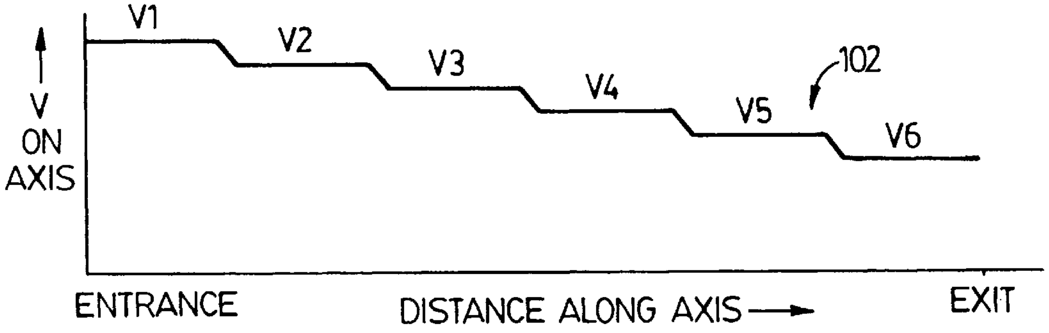
FIG. 16 shows the voltage gradient along the rod set of FIGS. 14 and 15.

The step wise potential shown in FIG. 16 produces an approximately constant axial field. While more sections over the same length will produce a finer step size and a closer approximation to a linear axial field, it is found that using six sections as shown produces good results.

In an example of use of the FIGS. 14 and 15 geometry, an RF quadrupole of rod length 22 cm and rod diameter 0.9 cm was divided into six sections as shown, and the same amplitude RF voltage was applied to all sections (the RF was applied to the A-sections and 180 degrees out of phase to the B-sections). Such a segmented quadrupole was utilized as Q0 (FIG. 1), i.e. as an entrance device to Q1, transmitting ions from an atmospheric pressure ion source 16 into Q1. The pressure in Q0 in this mode of operation was 8.0 millitorr. (Source 16 is thus a gaseous ion source for Q0, and Q0 is a gaseous ion source for Q1.)

The apparatus was then used to "peak hop" between two ions, i.e. between a low mass ion (m/z 40) and a high mass ion (m/z 609). In this mode of operation, there is a large jump in the RF and DC voltages applied to Q1 when jumping from low mass to high mass in Q1. Since Q0 receives RF from Q1 through capacitors C1, the jump in RF and DC voltages creates a short DC pulse on Q0 which has the undesirable effect of ejecting all the ions from Q0. Then a delay occurs while Q0 fills with ions and passes them onward again to Q1. If several ion intensities are monitored in sequence at a speed which is faster than the transit time through Q0, then the ions of any given mass entering Q1 never reach a steady state signal and the measured ion intensity is too low, and can be a function of measurement time. Mass spectrometer builders have lived with this problem because of the very high cost of providing a separate RF power supply for Q0.

Figure 17:
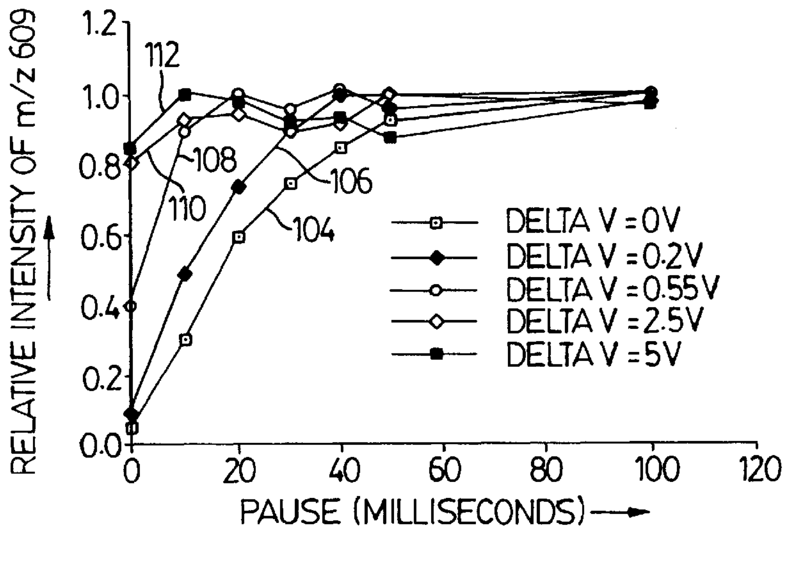
FIG. 17 is a graph showing recovery time when the rod set of FIGS. 14 and 15 is used as rod set Q0 of FIG. 1.

As a result, in a normal RF quadrupole Q0 at high pressure without an axial field, the ions can require several tens of milliseconds to reach a steady state signal. With the use of an axial field which keeps the ions moving through Q0, the recovery or fill up time of Q0 after a large change in RF voltage is much shorter. This is shown in FIG. 17, which plots the relative intensity of the m/z 609 ion on the vertical axis, and time on the horizontal axis. Five plots 104 to 112 are shown in FIG. 17, showing a difference in voltage ΔV between V1 and V6 of 0.0 volts, 0.2 volts, 0.55 volts, 2.5 volts and 5.0 volts respectively.

It will be seen from FIG. 17 that when the voltage difference ΔV along the total length of the rods is zero volts, corresponding to no axial field, approximately 50 milliseconds are required for the ion signal to reach steady state. As the axial field is increased, the time to reach a steady state signal decreases, to about 10 milliseconds with ΔV=5 volts. This corresponded to a gradient of about 5/6 volts per section.

The axial field thus permits the use of Q0 at high pressure in a situation where the ions must be transmitted rapidly at steady state from one end of the RF quadrupole Q0 to the other. In the example shown, a mode of operation is permitted in which several m/z values are sequentially monitored at a rapid rate (i.e. 10 milliseconds per m/z value), and in which the RF quadrupole Q0 can transmit each m/z ion from the ion source to the entrance of Q1 with little delay.

The benefit, relative to no axial field, will be greatest for long RF rods and for high pressure, where the gas is most effective in slowing the ions nearly to rest.

In the example shown, where six segments were used, the performance of the device in reducing the delay in transmission time through to zero was not highly sensitive to the precise voltages on the individual segments. The differences between segments could be varied by ±25% without significant effect on the performance. This suggested that the axial field need not be uniform in order to produce sufficient force to keep the ions moving through Q0.

It will also be realized that if desired, the potentials can be set to provide a potential well in the center of rod set 96 (i.e. with the center potential at a lower potential than those on each side of it) in order to trap the ions in the center. The potentials can then be changed to produce a strong gradient toward one end to eject the trapped ions. This arrangement will more usually be used in the collision cell Q2 (where the ions are fragmented and then ejected) than in the entrance device Q0.

Figure 18:
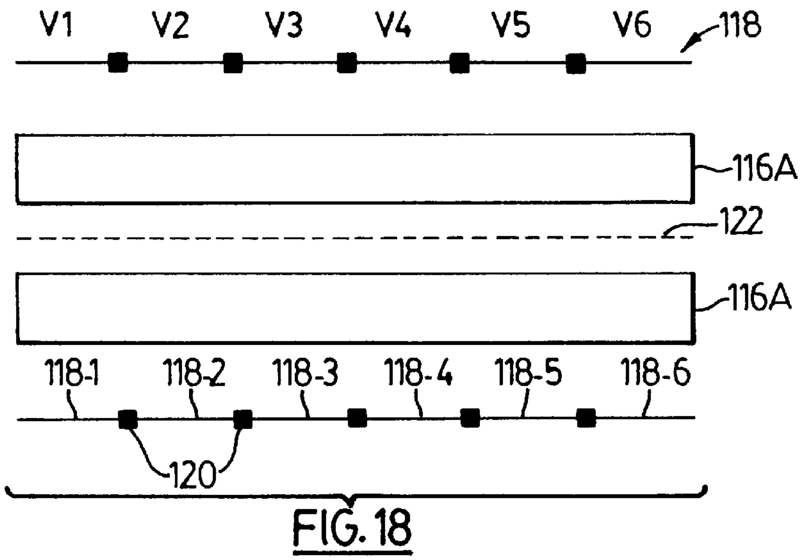
FIG. 18 is a side view of two rods of another modified rod set according to the invention.
Figure 19:
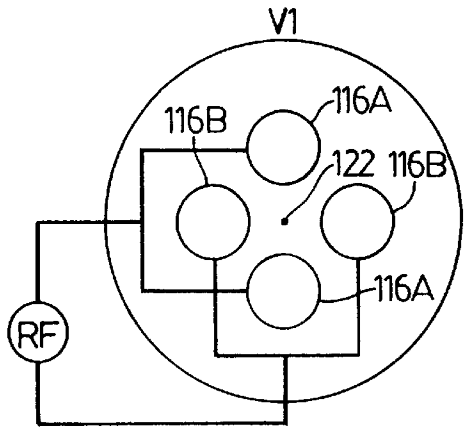
FIG. 19 is an end view of the rod set of FIG. 18 and showing electrical connections thereto.

Reference is next made to FIGS. 18 and 19, which show another method of producing an axial field in an RF quadrupole. In the FIGS. 18 and 19 arrangement, the quadrupole rods 116A, 116B are conventional but are surrounded by a cylindrical metal case or shell 118 which is divided into six segments 118-1 to 118-6, separated by insulating rings 120. The field at the central axis 122 of the quadrupole depends on the potentials on the rods 116A, 116B and also on the potential on the case 118. The exact contribution of the case depends on the distance from the central axis 122 to the case and can be determined by a suitable modelling program. With the case divided into segments, an axial field can be created in a fashion similar to that of FIGS. 15 and 16, i.e. in a step-wise fashion approximating a gradient.

It was determined by calculation that for a case diameter of 2.75 inches around a quadrupole with rods of diameter 0.615 inches, a voltage of about 100 volts DC applied to the case 118 adds a few tenths of a volt to the potential along central axis 122.

By way of an example, an RF quadrupole having its case 118 in six segments, each separated by insulating rings 120, was constructed and installed as the collision cell Q2 on a triple quadrupole mass spectrometer system 10 as shown in FIG. 1. Case 118 acted as case 60 of FIG. 1, to confine the collision gas. Voltages to the six segments were supplied through resistances R1 to R6 (FIG. 14) to provide equal voltage differences between segments. The voltages on the segments are represented by V1 to V6 FIG. 18. The total voltage difference across the six segments could be adjusted between 0 and 250 volts DC.

The effectiveness of this arrangement in eliminating interference due to ions slowly draining out of rod set Q2 was demonstrated by rapidly alternating between m/z 609/195 (where there should be a measurable ion signal from reserpine) and m/z 600/195 (where there should be no ion signal).

Figure 20:
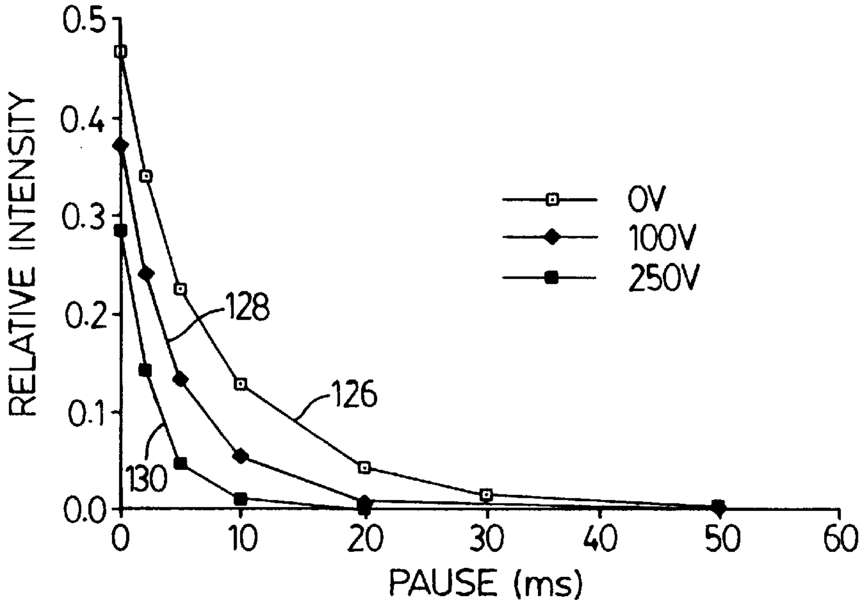
FIG. 20 is a plot showing recovery time when the rod set of FIGS. 18 and 19 is used as rod set Q2 of FIG. 1.

As shown by plot 126 in FIG. 20, with no axial field and no delay between measurements, there is an apparent signal at 600/195 which is actually due to m/z 609/195 ions still leaking through Q2 into Q3. approximately 30 milliseconds are required for the spurious signal to diminish to a low level and 50 milliseconds for it to diminish to zero. In use, a pause time of about 50 milliseconds or more would be needed to eliminate the interference.

With an axial field induced by 100 volts across the six sections of the case 118, the time for the parent signal to diminish nearly to zero was reduced to about 40 milliseconds as shown by plot 128. With an axial field induced by 250 volts, the required delay or pause time to eliminate the interference is reduced to less than 20 milliseconds as shown by plot 130.

Figure 21:
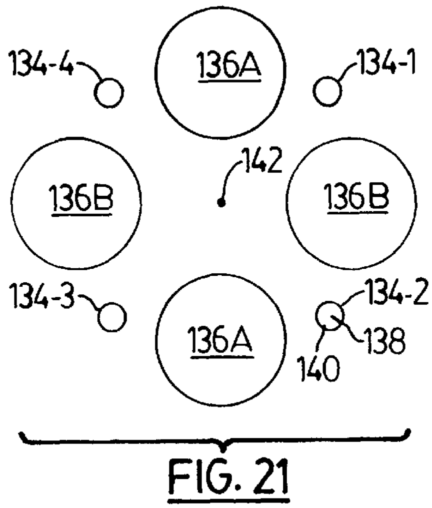
FIG. 21 is an end view of another modified rod set of the invention.
Figure 23:
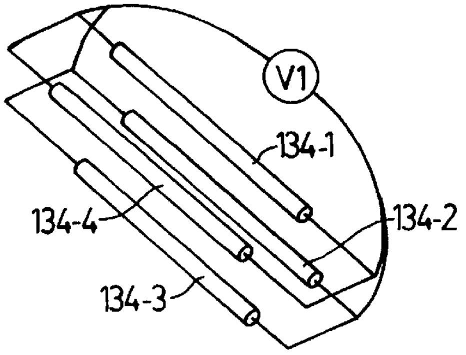
FIG. 23 is a perspective view of the auxiliary rods of the rod set of FIGS. 21 and 22 and showing electrical connections to the auxiliary rods.
Figure 22:
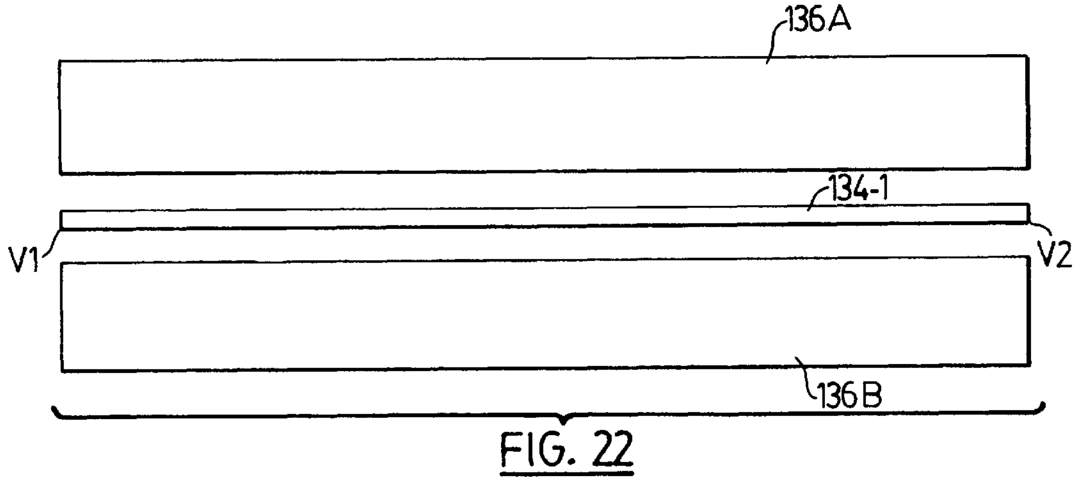
FIG. 22 is a side view of two rods and an auxiliary rod of the rod set of FIG. 21.

Reference is next made to FIGS. 21 to 23, which show another method of inducing an axial field along a rod set. As shown in FIGS. 21 to 23, four small auxiliary electrodes or rods 134-1 to 134-4 are mounted in the spaces between the quadrupole rods 136A, 136B. In the example shown, the auxiliary rods 134-1 to 134-4 are mounted in a square configuration, equidistant between the quadrupole rods 136A, 136B but with the square defined by rods 134-1 to 134-4 rotated at 45° with respect to the square formed by the axes of the quadrupole rods. Each auxiliary rod 134-1 to 134-4 has an insulating core 138 with a surface layer of resistive material 140.

A voltage applied between the two ends of each rod 134-1 to 134-4 causes a current to flow in the resistive layer, establishing a potential gradient from one end to the other. With all four auxiliary rods connected in parallel, i.e. with the same voltage difference V1 (FIG. 23) between the ends of the auxiliary rods, the fields generated contribute to the electric field on the central axis 142 of the quadrupole, establishing an axial field or gradient.

If the resistive layer 140 is of constant resistivity, then the field will be constant. A non-uniform layer may be applied to generate a non-linear field if desired. The magnitude of the field along the axis 142 of the quadrupole is determined by the potential difference V1 between the ends of the auxiliary rods 134-1 to 134-4, and by the distance of the auxiliary rods from the axis 142 of the quadrupole.

In use, an RF quadrupole of the kind shown in FIGS. 21 to 23 was placed in the position of Q0, i.e. as an entrance device to Q1. As described in connection with FIGS. 14 to 17, when ions are ejected from Q0 (by the DC voltage pulse induced by the large jump in RF voltage on Q1 which occurs when jumping from low to high mass), there is a delay before the high mass ions can be transmitted through Q0 and reach Q1. By monitoring the ion signal when jumping between low and high mass, and varying the delay time before measurement of the high mass signal, the recovery time of the ion signal can be measured.

Figure 24:
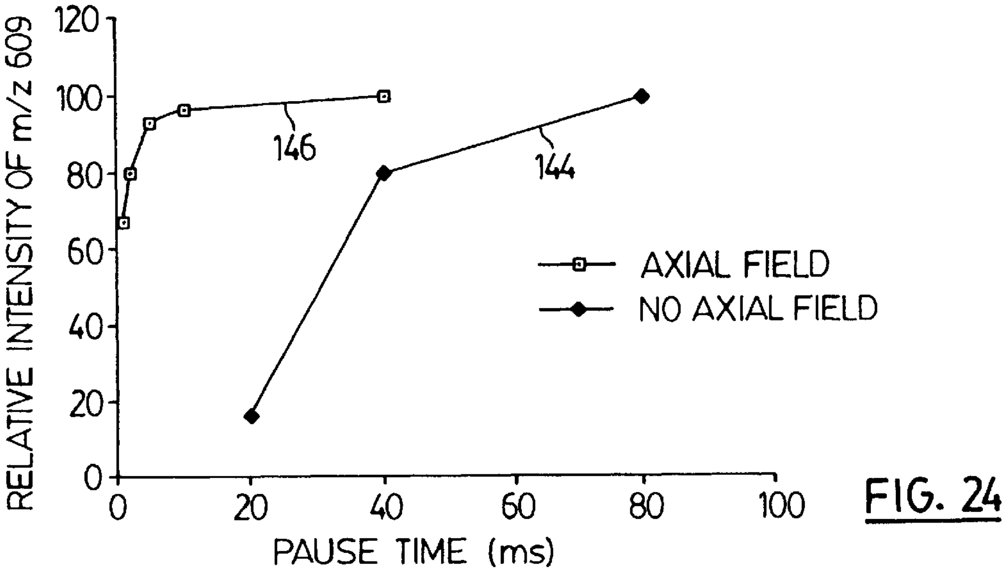
FIG. 24 is a plot showing the recovery time of the ion signal when the rod set of FIGS. 21 to 23 is used as rod set Q0 of FIG. 1.

As shown for plot 144 in FIG. 24, which plots relative intensity of the m/z 609 ion on the vertical axis and time in milliseconds on the horizontal axis, more than 80 milliseconds are required for the ions to reach a steady state signal, i.e. for Q0 to fill up and transmit a steady state stream of ions into Q1, after jumping from mass 40 to mass m/z 609 on Q1.

With an axial field induced by 90 volts across the length of the four posts 134-1 to 134-4, the recovery or fill time indicated by plot 146 in FIG. 24 is reduced to less than 40 milliseconds, and indeed to less than 20 milliseconds to reach a level close to steady state. A larger potential difference would lead to a faster recovery.

Figure 25:
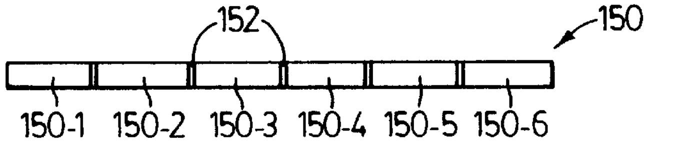
FIG. 25 is a side view of a modified auxiliary rod for a rod set according to the invention.

While the auxiliary rods or electrodes 134-1 to 134-4 have been shown as coated with resistive material, they can if desired be segmented, as shown for auxiliary rod 150 in FIG. 25. Rod 150 is divided into e.g. six segments 150-l to 150-6 separated by insulated rings 152. Different voltages V1 to V6 may be applied to the segmented auxiliary rods 150 as in the case of the segmented shell 118 of FIGS. 18, 19.

Figure 26:
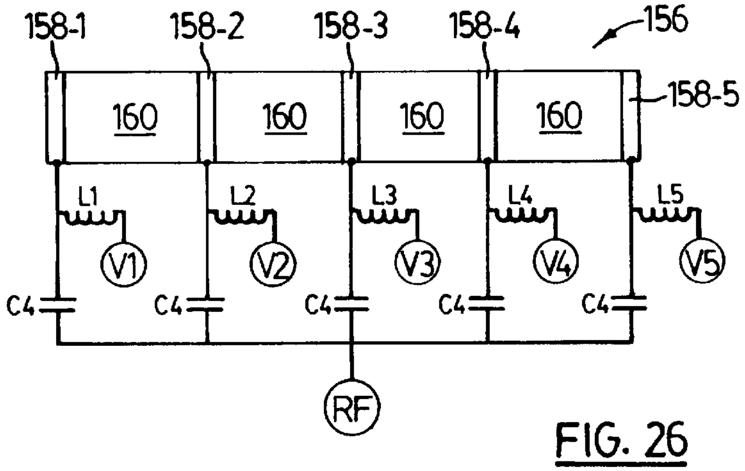
FIG. 26 is a side view of another embodiment of a rod for a rod set according to the invention.

Various other methods can be used to generate an axial field along the axis of a quadrupole (or other multi-rod set). For example, reference is made to FIG. 26, which shows a single rod 156 of a quadrupole. Rod 156 has five encircling conductive metal bands 158-1 to 158-5 as shown, dividing the rod into four segments 160. The rest of the rod surface, i.e. each segment 160, is coated with resistive material to have a surface resistivity of between 2.0 and 50 ohms per square. The choice of five bands is a compromise between complexity of design versus maximum axial field, one constraint being the heat generated at the resistive surfaces.

RF is applied to the metal bands 158-1 to 158-5 from controller 50 via 15 capacitors C4. Separate DC potentials V1 to V5 are applied to each metal band 158-1 to 158-5 via RF blocking chokes L1 to L5 respectively.

In use of the FIG. 25 embodiment, the RF applied equally to all the bands 158-1 to 158-5 is also conducted to some extent through the resistive coatings on segments 160 to provide a relatively uniform RF field along the length of the rod 156. However with different DC voltages V1 to V5 applied to the bands, a DC voltage gradient is established along the length of the rod 156. Any desired gradient can be chosen, e.g. a gradient entirely in one direction to speed passage of ions through the rod set, or a gradient having a potential well at the center (lengthwise) of the rod set, for use in ion containment applications.

Figure 27:
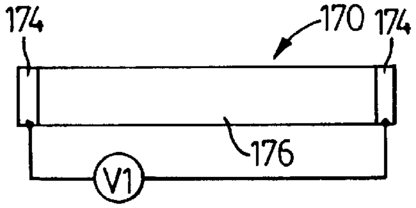
FIG. 27 is a side view of still another embodiment of a rod for a rod set according to the invention.
Figure 28:
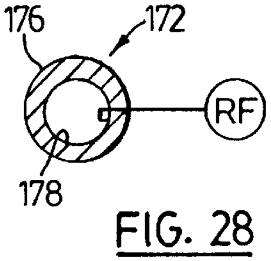
FIG. 28 is a cross-sectional view at the center of the rod of FIG. 27.

Reference is next made to FIGS. 27 and 28, which show another single rod 170 of a rod set such as a quadrupole. Rod 170 is formed as an insulating ceramic tube 172 having on its exterior surface a pair of end metal bands 174 which are highly conductive. Bands 174 are separated by an exterior resistive outer surface coating 176. The inside of tube 172 is coated with conductive metal 178. The wall of tube 172 is relatively thin, e.g. about 0.5 mm to 1.0 mm.

The surface resistivity of the exterior resistive surface 176 will normally be between 1.0 and 10 Mohm per square. A DC voltage difference indicated by V1 and V2 is connected to the resistive surface 176 by the two metal bands 174, while the RF from power supply 48 (FIG. 1) is connected to the interior conductive metal surface 178.

The high resistivity of outer surface 176 restricts the electrons in the outer surface from responding to the RF (which is at a frequency of about 1.0 MHz), and therefore the RF is able to pass through the resistive surface with little attenuation. At the same time voltage source V1 establishes a DC gradient along the length of the rod 170, again establishing an axial DC field.

Figure 28A:
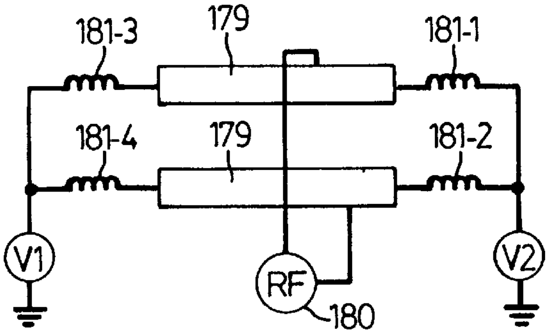
FIG. 28A is a diagrammatic view of a modified rod set according to the invention.
Figure 28B:
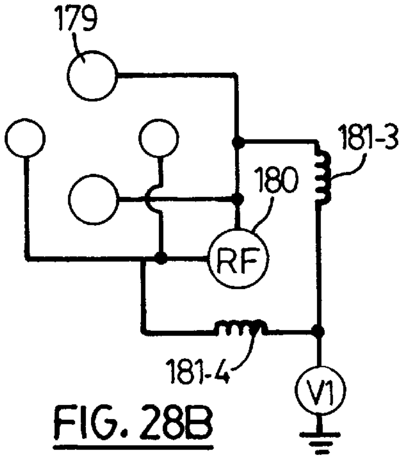
FIG. 28B is an end view of the rod set of FIG. 28A.

FIGS. 28A, 28B show a modified rod arrangement. In FIGS. 28A, 28B each quadrupole rod 179 is coated with a surface material of low resistivity, e.g. 300 ohms per square, and RF potentials are applied to the rods in a conventional way by RF source 180. Separate DC voltages V1, V2 are applied to each end of all four rods through RF chokes 181-1 to 181-4. The low resistance of the surface of rods 179 will not materially affect the RF field but will allow a DC voltage gradient along the length of the rods, establishing an axial field. The resistivity should not be too high or resistance heating may occur. (Alternatively external rods or a shell can be used with a resistive coating.)

In some cases it may be sufficient to apply an axial field along only a portion of the length of the rod set. For example, since the ions entering the rod set are usually travelling relatively quickly and may slow down only along the last half of the length of the rod set, it may be sufficient for some applications, where the objective is to speed the passage of the ions through the rod set, to apply the axial field only along the last half or last portion of the length of the rod set. However in all cases where segmented rods or a segmented case or posts are used, there will normally be more than two segments, since unless the rod set is extremely short (one or two inches at the most), providing only two segments will not provide a field which extends along a sufficient portion of the length of the rod set. Preferably there will be at least three segments, and generally there will be more than three segments.

Figure 29:
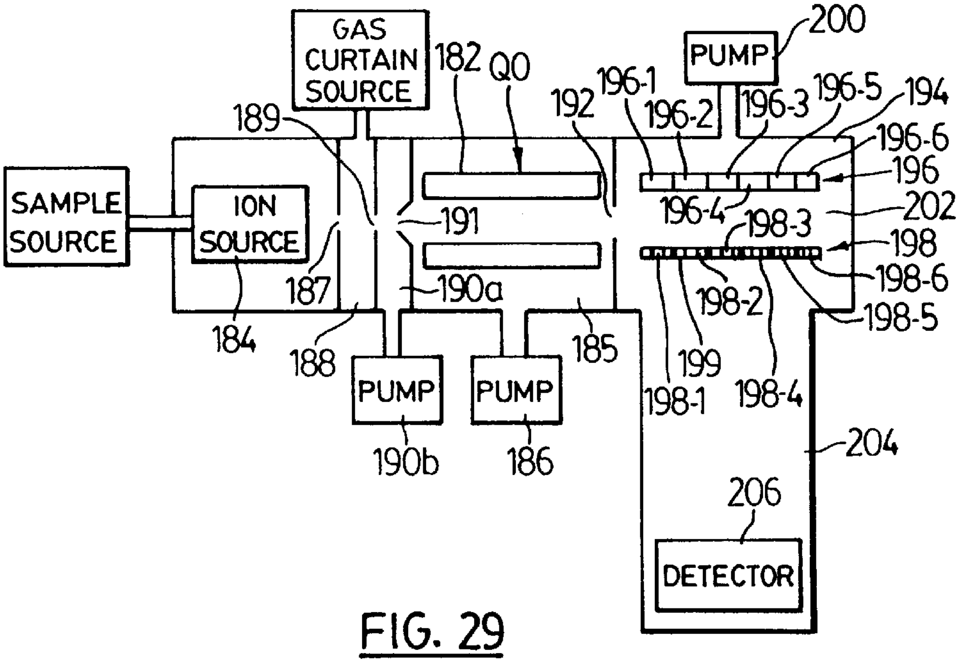
FIG. 29 is a diagrammatic view of a modified arrangement according to the invention, using plates which eject ions sideways into a time of flight tube.

Reference is next made to FIG. 29, which shows a high pressure entrance rod set 182 (functioning as Q0) which receives ions from an atmospheric pressure ion source 184. Rod set 182 is located in chamber 185 pumped by pump 186. Ions from source 184 are transmitted into Q0 through an opening 187, a gas curtain chamber 188, an aperture 189, a first stage vacuum chamber 190a pumped by pump 190b, and a skimmer orifice 191. From Q0, ions are directed through orifice 192 into a low pressure region 194 containing a pair of plates 196, 198, one of which (plate 198) is simply a wire grid. The low pressure region 194 is evacuated by a pump 200. In known fashion, ions in the low pressure volume 202 between plates 196, 198 may be pulsed sideways, as a group, by suitable DC pulses, into a Time-of-Flight drift tube 204, at the end of which is located a detector 206. The axial velocity of ions in rod set Q0' can be controlled by applying DC axial potentials as described, in order to eliminate problems associated with fill and empty times of Q0. Control of the axial field also allows control of the timing of admission of ions into the volume 202 between plates 196, 198. Plates 196, 198 can also be formed as described to provide an axial DC field along their length, e.g. they can be segmented along their length, as indicated by segments 196-1 to 196-6 and 198-1 to 198-6, the segments being separated by insulating strips 199. Alternatively auxiliary rods (not shown) can be provided. By controlling the axial field so provided, ions entering the low pressure volume 202 between plates 196, 198 can be slowed to a stop in the axial direction and can then be pulsed sideways as a group down Time-of-Flight tube 204 for detection in conventional manner.

Since the Time-of-Flight system shown in FIG. 29 is a pulsed device, it may be advantageous to store ions in Q0 while one ion pulse is being analyzed (by for example, raising the potential on the exit plate), and then admit the next pulse of ions into the extraction plates 196, 198. An axial field in Q0 can be used to rapidly eject the ions into the extraction region when required so as to have a narrower pulse than would be available if the ions were simply to leak out due to space charge.

Figure 30:
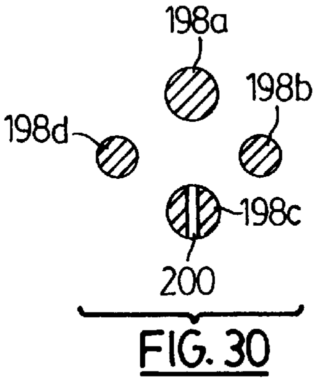
FIG. 30 is an end view of a modified rod set with which the axial field of the invention may be used.

The plates 196, 198 may alternately be replaced by an RF quadrupole with rods 198*a*, 198*b*, 198*c*, 198*d* (FIG. 30) and with a slot 200 in one rod 198*c*, as described in the copending application of Charles Jolliffe entitled "Mass Spectrometer with Radial Ejection". The RF rods in this region will confine the ions to a narrow radial position in space, and an axial field may be applied after admitting the ions, in order to slow them to a stop in the axial direction. After slowing the ions, or bringing them to rest, a voltage pulse may be applied to the opposite rod 198*a* in order to inject the ions through slot 200 into the flight tube for analysis. Since it is known in such a device that the ions should be moving slowly, or more advantageously, not at all, before they are injected into the Time-of-Flight, the ability to apply a reverse field to slow the ions down will result in improved performance of the Time-of-Flight system.

Also, an axial field can be applied to an RF quadrupole or multipole which is used as an entrance device to any mass spectrometer or ion optical device, where it is an object to control the energy of the ions, or to move the ions through the multipole under the action of the axial field, whether in combination with the action of a cooling or collision gas or drift gas, or without a cooling gas where it is desired to control or change the axial ion energy inside the multipole by applying an axial field, or where it is advantageous to move ions quickly from inside the multipole into another device. For example, RF rods which direct ions into an ion trap can be advantageously used to store ions before admission in the ion trap, as described in U.S. Pat. No. 5,179,278. An axial field can be used to assist in injecting the ions from the RF rods into the ion trap in a shorter time than if the ions are allowed to leak in under the action of space charge.

Another advantage of the axial field device is that in the presence of cooling gas, the axial field can be used to provide some separation of ions as they drift through the device under the action of the axial field, while the collisional focusing in the radial direction prevents ions from being lost by diffusion. For example, if ions are admitted into an RF multipole with an axial field, in the presence of cooling gas or drift gas, the ion velocity will reach a constant value which is proportional to the axial field. Ions of different size will drift at different velocities dependant on their shape, mass and charge, and be separated in time when they reach the exit of the device. If the exit gate (e.g. a lens at exit orifice 192) is opened at an appropriate time, only ions of a certain type will be admitted in the following analyzing device or other detector such as a mass spectrometer. This mobility separation may be applied to assist in the analysis of a mixture of ions, where ions of the same or similar masses may have different drift times, thus adding an additional degree of specificity to the analysis.

Another application of the axial field described is for use in assisting ion dissociation where required, particularly in the collision cell Q2. In the collision cell Q2, dissociation is usually achieved by collisions between the ions and the collision gas present in Q2. However as collisions between ions and the collision gas slow the ions to a very low speed, the efficiency of the dissociation drops, and the dissociation process can be relatively time consuming. By using the axial field to drive the ions forwardly through the collision cell, the efficiency of the dissociation process is improved.

Figure 31:
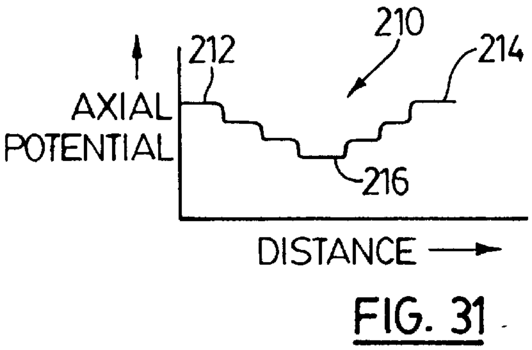
FIG. 31 is a plot showing a pattern for the axial field along the plates of the FIG. 29 embodiment.

In addition, if desired the axial field can be arranged to have a profile as shown by plot 210 in FIG. 31, having a higher potential 212, 214 at each end and a potential well 216 at the middle of Q2. The axial field in the vicinity of the well 216 can then be axially oscillated at high frequency, to oscillate the ions axially about their equilibrium positions. It is important during such oscillation not to drive the majority of the ions out the ends of Q2, and therefore the controller 50 will vary e.g. voltages V3 and V4 (in the FIGS. 18, 19 embodiment), or if desired all of V1 to V6, in such a way as to oscillate the ions axially about their equilibrium positions by a limited amplitude. It may be preferred not to have the well 216, but instead simply to oscillate the axial field back and forth and to prevent most ions from being lost out the ends of the rod set by controlling the duration of each half cycle of the oscillation and the axial field intensity.

There is no requirement to operate at the resonant frequency of the ions, or even at a harmonic of the resonant frequency; the axial field excitation can for example be a square wave. Without substantial loss the ions can be axially oscillated about their equilibrium positions by (for example) about ±2.5 cm (as contrasted with a conventional ion trap where the oscillation amplitude is limited to about ±0.71 cm). Since the maximum energy which can be input to the ions scales as the maximum distance from equilibrium, therefore the energy input to the ions can be considerably larger than that achieved in a conventional ion trap.

The axial oscillation described can be useful not only for fragmenting large ions in MS/MS, but also for dissociating oxide ions in inductively coupled plasma applications (where the ion source is a plasma), and for other ions.

If desired, the axial field of the invention may be used in an RF only quadrupole (such as Q0) in a resolving mode. In this technique, damping gas at a suitable pressure (e.g. 8 millitorr) is admitted into Q0, so that when ions enter Q0, collisional focusing occurs (as described in U.S. Pat. No. 5,179,278), collapsing the ions to a small region around the axis of Q0. The axial field applied causes the ions to move through Q0 axially. A filtered noise field is applied to the rods of Q0 (as described and shown in FIG. 5 of U.S. Pat. No. 5,179,278 the description and drawings of which are incorporated herein by reference) with a notch in the noise field, to eject all ions except those of a mass (or in a mass range) of interest.

Figure 32:
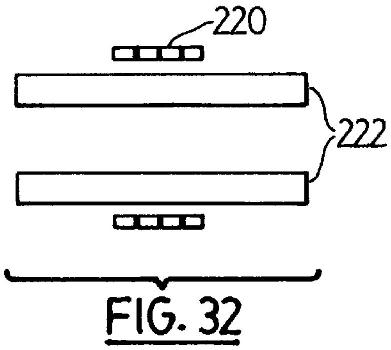
FIG. 32 is a diagrammatic view of another rod set according to the invention.

The axial field of the invention may also be used in a resolving (low pressure e.g. less than 0.1 millitorr) quadrupole (e.g. Q1 when conventional AC and DC voltages are applied to its rods) to alleviate the effects of fringing fields at the entrance and exit of Q1 which tend to interfere with ions entering or leaving Q1. An axial field can be placed at the entrance and exit to a resolving quadrupole such as Q1 to speed up ions as they enter and leave Q1, but to slow down their passage through the center portion of Q1 so that they will undergo more oscillations in the resolving field, thereby increasing the resolution of Q1. This can be accomplished as shown in FIG. 32 by providing a segmented case or auxiliary rods or electrodes 220 around the resolving or center portion of rods 222, and by adjusting the entrance and exit offsets to speed ions into and out of rod set 222 but adjusting the axial potential created by case or rods 220 to slow down ions during their passage through the center portion of rod set 222. Alternatively, the shell 118 (FIG. 18) or auxiliary segmented rods 150 (FIG. 25) can be used (and if desired extended beyond each end of the quadrupole rod set) to speed up ions entering and leaving the resolving rod set and to slow down (axially) ions travelling through the center portion of the rod set.

Figure 33:
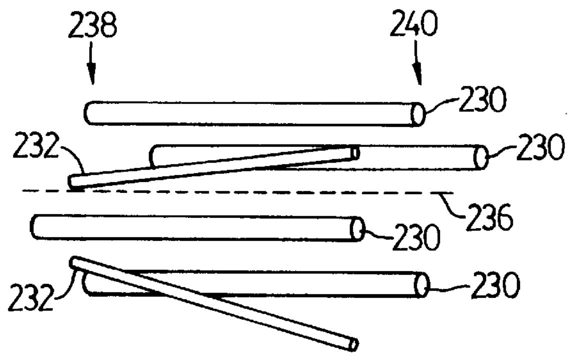
FIG. 33 is a side view of a still further embodiment of a rod set according to the invention.
Figure 34:
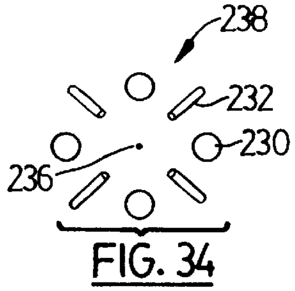
FIG. 34 is an end view from one end of the rod set of FIG. 33.
Figure 35:
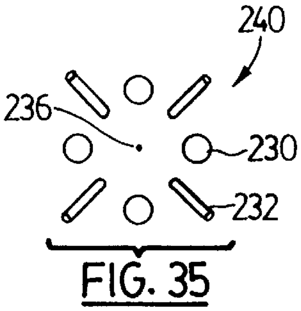
FIG. 35 is an end view from the other end of the rod set of FIG. 33.

Reference is next made to FIGS. 33 to 36, which show another variation of the use of auxiliary rods or electrodes for producing a DC voltage gradient along the length of a set of quadrupole rods 230. In the FIGS. 33 to 36 version, four parallel auxiliary rods 232 are used, mounted in a square configuration between the quadrupole rods 230 as shown. (Only two auxiliary rods 232 are shown in FIG. 33 for clarity; all four auxiliary rods are shown in FIGS. 34 and 35.)

Figure 36:
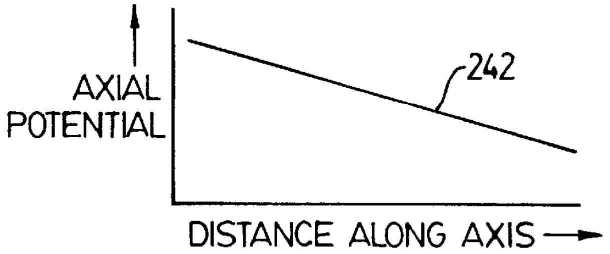
FIG. 36 is a plot showing a typical DC voltage gradient along the center axis of the rod set of FIGS. 33 to 35.

The auxiliary rods 232 are tilted, so that they are closer to the central axis 236 of the rod set 230 at one end 238 than at the other end 240 of the rods 230. Since the auxiliary rods are closer to the axis at end 238 than at end 240, the potential at end 238 is more affected by the potential on the auxiliary rods than at the other end 240. The result, as shown in FIG. 36, is an axial potential 242 which varies uniformly from one end to the other since the auxiliary rods are straight. The potential can be made to vary in a non-linear fashion if the auxiliary rods 232 are curved.

An advantage of the embodiment shown in FIGS. 33 to 36 is that the RF quadrupole geometry is standard, and the auxiliary rods 232 are simply conductive metal rather than being resistively coated. Therefore they are easier to build. In addition, generation of a strong axial field in the FIGS. 33 to 36 embodiment does not impose large transverse fields (which can cause ion losses) as does the tapered rod method shown in FIGS. 2 to 5.

While the tilted auxiliary rods 232 of FIGS. 33 to 36 have been shown as extending along the entire length of the electrode rods 230, they can of course extend along only part of that length and can be placed between the ends of the rods 230, or adjacent one or other of the ends, depending on the application. For example they can be used to generate axial fields at the entrance or exit of a mass resolving quadrupole, for the purposes of improving ion transfer through the fringing fields at the entrance and exit ends, and for introducing very low energy ions into a quadrupole.

Figure 37:
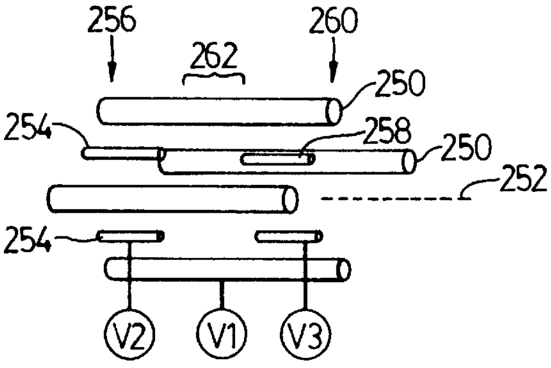
FIG. 37 is a side view of a further modified rod set according to the invention.
Figure 38:
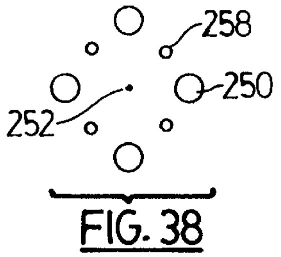
FIG. 38 is an end view of the rod set of FIG. 37.

Reference is next made to FIGS. 37 and 38, which show a conventional quadrupole rod set 250 having a central axis 252. A first set of four auxiliary rods 254 (of which only two are shown in FIG. 37) is provided, located between the rods 250 and extending from the entrance end 256 of the rods 250 about one-third of the length of the rods 250.

A second set of four auxiliary rods 258 is provided, also located between the rods 250 and extending along the last third of the length of rods 250 (ending at the ends 260 of rods 250). The middle third of the length of rods 250, indicated at 262 in FIG. 37, is free of the presence of the auxiliary rods.

A conventional DC offset voltage V1 is applied to electrode rods 250. A higher DC voltage V2 is applied to auxiliary rods 254, while a voltage V3 which exceeds voltage V1 but is less than voltage V2 is applied to auxiliary rods 258.

Figure 39:
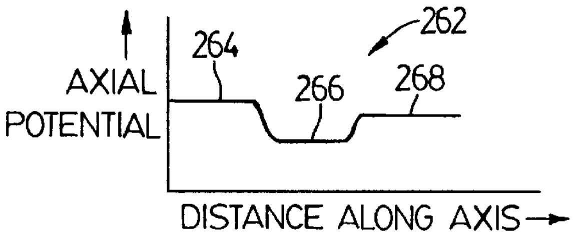
FIG. 39 is a plot showing a typical DC voltage gradient along the center axis of the rod set of FIGS. 37, 38.

These potentials create an axial voltage along the axis 252 of electrode rods 250 as shown at 262 in FIG. 39. As shown, axial potential 262 has a plateau 264 extending along the first third of the length of rods 250. The plateau 264 is followed by a well 266, where the axial DC potential is set by the offset voltage V1 applied to the rods 250. Along the last third of the length of the rods 250, the axial potential rises to another plateau 268 which is lower than plateau 264.

When ions are introduced into the rods 250, for example when the rods 250 serve as the collision cell Q2 of FIG. 1, collisions occur and the ions lose energy. When the ions lose energy in the central portion 262 of the rods 250, they are trapped between the two plateaus 264, 262, encouraging more collisions and fragmentation if the ion energies are sufficient for this purpose. The ions and/or fragments are then preferentially ejected toward the exit end 260 of the rod set, since the plateau 268 is lower than the plateau 264. Plateau 268 can if desired by sloped, to establish an axial field along the last third of the rod set 250 which will speed the exit of ions from the trap at the center of the rod set. Alternatively, other shapes can be used, to slow the ejection of ions if desired.

Alternatively, if the ions are to be ejected into a time-of-flight drift tube, they can be accumulated in well 266 and then as mentioned preferentially ejected toward the exit end 260 since the plateau 268 is lower than plateau 264 (or the plateau 268 can if desired be lowered at the time when the ions are to be ejected, by reducing voltage V3).

Figure 40:
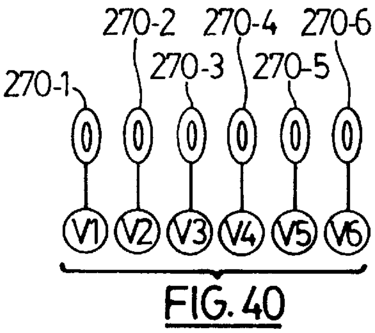
FIG. 40 is a diagrammatic view of a modified external electrode set according to the invention.

It will be realized from the foregoing disclosure that various methods may be used to establish an axial field. The methods include external devices (e.g. external shells or auxiliary rods), manipulation of the rods themselves (e.g. by changing their shapes, their orientation, segmenting them, or applying resistive surfaces to them), and other methods which will produce an axial field. An additional example is shown in FIG. 40, where the segmented casing of FIGS. 18, 19 has been converted to a set of external grids 270-1 to 270-4, each extending around the rods (not shown in FIG. 40) and each connected to a different potential V1 to V6. The grids can be circular, square, or of other desired configuration. In addition, when auxiliary rods or electrodes are used, the number of rods need not be the same as the number of rods of the multipole; an axial field can be established with only two auxiliary rods or electrodes, located opposite each other.

It will also be realized that the axial field of the invention may be used with various kinds of electrode sets, e.g. tripoles, quadrupoles, hexapoles and octopoles, as well as plates described in connection with FIG. 29. Electrode sets using the axial field of the invention may also be used to direct ions into any other suitable apparatus, e.g. an ion trap, a Time-of-Flight spectrometer (as mentioned), or an optical spectrometer.

While the rod sets illustrated have been shown as linear, it will be understood that if desired (e.g. for compactness) they can be curved, e.g. in the form of a semi-circle or other desired arcuate shape. The central longitudinal axis will then of course follow the curved configuration but all else will remain essentially the same.

While the axial field described has been explained in the context of a mass spectrometer, it can also be used for controlling ion movement in other applications, e.g. optical spectrometers or in other suitable applications.

While preferred embodiments of the invention have been described, it will be appreciated that changes may be made within the spirit of the invention and all such changes are intended to be included in the scope of the claims.

What is claimed is:

1. A method of mass analyzing a sample comprising:

(a) defining a volume between a set of elongated multipole rods, said volume having an elongated axial dimension and a radial dimension, and further including an entrance and an exit located on the axis, (b) providing a collision gas in said volume, (c) introducing ions at the entrance to the volume, (d) applying an AC potential at least to said rods to confine ions in said volume for passage through the volume from the entrance to the exit, (e) causing ions in said volume to fragment, (f) rapidly varying said ions introduced at the entrance from first ions of a first mass to charge ratio to second ions of a second and different mass to charge ratio, and repeating such rapid variation, (g) detecting ions leaving the exit of the volume, and providing a pause time of selected duration between detection of ions during supply of said first ions and detection of ions during supply of said second ions, (h) and establishing an axial DC electric field in said volume to cause substantially all of said first ions in said volume during said pause time to exit said volume within said pause time.

2. A method as claimed in claim 1, wherein step (e) comprises providing ions from an upstream multipole rod set and rapidly varying a resolving potential applied to the upstream rod set, to effect a rapid switch from said first ions to said second ions.

3. A method of analyzing a sample comprising:

(a) isolating parent ions, (b) fragmenting said parent ions in a volume defined by an elongated multipole rod set, to produce a set of fragment ions in said volume, said volume containing a collision gas to promote the formation of said fragments, (c) injecting said fragment ions into a mass spectrometer following said multipole rod set, for analysis of said fragments, (d) scanning said parent ions over a mass range, thereby producing a parent ion scan, (e) establishing an axial field in said rod set to speed transmission of fragment ions therefrom into said following mass spectrometer whereby when the step of scanning the parent ions has moved from a previous parent ion to a subsequent parent ion, the time required for fragment ions from the previous parent ion to clear the volume and enter the following mass spectrometer will be reduced, thereby enabling faster scanning of a desired parent ion range, without loss of mass resolution or sensitivity.

4. A method of analyzing a sample comprising:

(a) injecting ions from an ion source into a first multipole elongated rod set defining a volume having a longitudinal axis, and applying an AC voltage to the rod set for transmitting first ions of interest through said volume, (b) transmitting the first ions of interest from said first rod set into a following multipole rod set for further processing, to produce a first output ion measurement, (c) rapidly changing the AC potential applied to said first multipole rod set from a first value to a second value to transmit second, ions of interest into said following multipole rod set for further processing, to produce a second output ion measurement, (d) applying an axial D.C. electric field along at least a portion of said axis of the first multipole rod set to cause said second ions of interest from said source to rapidly refill said volume, to decrease the time required for said second ions in said volume to reach a steady state for said second output ion measurement.

5. A method according to claim 4 wherein a second voltage is applied to said following rod set, said first voltage being derived from said second voltage, and including the step of rapidly changing said second voltage between first and second values and thereby said first voltage, to cause said following rod set to transmit ions of low mass to charge ratio and then ions of a higher mass to charge ratio.

6. A method of improving the fragmentation efficiency of an RF multipole rod set, said rod set defining an elongated volume having a longitudinal axis and an exit, and a collision gas in said volume, said method comprising injecting ions into said volume with an axial velocity, and applying an axial electric field along said axis to increase the collision energy of said ions.

7. A method according to claim 6 and including the step of alternating said axial potential so that said ions are oscillated along said axis as they drift toward the exit of said volume, thereby increasing the number of collisions and the energy of collisions experienced by said ions.

* * * * *